US012789848B2

(12) United States Patent
Jang

(10) Patent No.: US 12,789,848 B2
(45) Date of Patent: Nov. 10, 2026

(54) VEHICLE CONTROL APPARATUS AND METHOD THEREOF

(71) Applicants: Hyundai Motor Company, Seoul (KR); Kia Corporation, Seoul (KR)

(72) Inventor: Sung Woo Jang, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 76 days.

(21) Appl. No.: 18/912,931

(22) Filed: Oct. 11, 2024

(65) Prior Publication Data

US 2025/0319899 A1 Oct. 16, 2025

(30) Foreign Application Priority Data

Apr. 15, 2024 (KR) ........................ 10-2024-0050221

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ............. B60W 60/0015; B60W 30/09; B60W 30/0956; B60W 40/13; B60W 2040/1315;
(Continued)

(56) References Cited

U.S. PATENT DOCUMENTS 11,390,300 B2 * 7/2022 Phillips ........... B60W 60/00276
11,794,777 B1 * 10/2023 Suissa ................ B60W 60/0011
(Continued)

FOREIGN PATENT DOCUMENTS

CN 115027464 A * 9/2022 .......... B60W 60/001

OTHER PUBLICATIONS

Machine translation of CN115027464A downloaded from IP.com Feb. 9, 2026 (Year: 2026).*

*Primary Examiner* — Kito R Robinson
*Assistant Examiner* — Tanya C Sienko
(74) *Attorney, Agent, or Firm* — Banner & Witcoff, Ltd.

(57) ABSTRACT

Disclosed is a vehicle control apparatus which includes a sensor, memory, and a controller. For example, the vehicle control apparatus may obtain, using the sensor, environmental information about a surrounding environment of a vehicle that is driving and driving information of the vehicle, determine a plurality of boundary paths for driving of the vehicle, based on at least one of the environmental information, the driving information, or a maximum drivable curvature of the vehicle, determine an expected driving path based on a curvature required for the vehicle to drive to a destination, determine, based on the expected driving path being located within the plurality of boundary paths, a steering angle for following the expected driving path, update the expected driving path based on the determined steering angle, the environmental information, and the driving information, and control the vehicle based on the updated expected driving path.

20 Claims, 10 Drawing Sheets

(51) Int. Cl.
*B60W 30/095* (2012.01)
*B60W 40/13* (2012.01)

(52) U.S. Cl.
CPC ..... *B60W 40/13* (2013.01); *B60W 2040/1315* (2013.01); *B60W 2520/105* (2013.01); *B60W 2520/14* (2013.01); *B60W 2520/20* (2013.01); *B60W 2540/18* (2013.01); *B60W 2552/30* (2020.02); *B60W 2554/80* (2020.02)

(58) Field of Classification Search
CPC ....... B60W 2520/105; B60W 2520/14; B60W 2520/20; B60W 2540/18; B60W 2552/30; B60W 2554/80; B60W 30/18145; B60W 60/0011; B60W 2520/10; B60W 60/001; B60W 40/02; B60W 40/10; B60W 2520/06; B60W 50/029; B60W 50/0205; B60W 50/14; B60W 2050/021; B60W 2556/10; B60W 2556/45; G06N 20/00
See application file for complete search history.

(56) References Cited

U.S. PATENT DOCUMENTS

| | | | | |
|---|---|---|---|---|
| 12,208,819 | B1 * | 1/2025 | Funke | B60W 60/0011 |
| 2003/0040849 | A1 * | 2/2003 | Hathout | B60T 8/17551 701/1 |
| 2017/0057545 | A1 * | 3/2017 | Laur | G05D 1/0246 |
| 2018/0188031 | A1 * | 7/2018 | Samper | B60W 60/0011 |
| 2019/0355257 | A1 * | 11/2019 | Caldwell | B60W 30/0956 |
| 2020/0341474 | A1 * | 10/2020 | Zuo | G05D 1/0088 |
| 2021/0271245 | A1 * | 9/2021 | Bradley | G05D 1/227 |
| 2021/0373566 | A1 * | 12/2021 | Agarwal | B60W 30/18145 |
| 2022/0227367 | A1 * | 7/2022 | Kario | G06V 40/103 |
| 2022/0340137 | A1 * | 10/2022 | Ollis | B60W 30/09 |
| 2022/0358696 | A1 * | 11/2022 | Holder | G06T 11/26 |
| 2023/0339506 | A1 * | 10/2023 | Mamchuk | B60W 50/0098 |
| 2024/0092350 | A1 * | 3/2024 | Agrawal | B60W 40/04 |
| 2024/0123975 | A1 * | 4/2024 | Sridharan | B60W 30/09 |
| 2024/0174239 | A1 * | 5/2024 | Narayanan | B60W 60/001 |

* cited by examiner

VEHICLE CONTROL APPARATUS AND METHOD THEREOF

CROSS-REFERENCE TO RELATED APPLICATION

This application claims the benefit of priority to Korean Patent Application No. 10-2024-0050221, filed in the Korean Intellectual Property Office on Apr. 15, 2024, the entire contents of which are incorporated herein by reference.

TECHNICAL FIELD

The present disclosure relates to a vehicle control apparatus and a method thereof, and more particularly, relates to technologies for determining a driving path for driving control of vehicle.

BACKGROUND

As the autonomous and semi-autonomous driving control technology matures, a reliable driving technology for a vehicle (e.g., a host vehicle) may gradually become more sophisticated. For example, a technology for automatically determining (e.g., generating) a driving path based on a real-time driving state of the host vehicle or a surrounding environment state of the host vehicle and continuously updating the driving path while controlling the host vehicle by means of the generated driving path may be developed.

Meanwhile, the technology for generating the driving path may be implemented in various manners. For example, according to a driving path generation algorithm, a vehicle control apparatus may generate a driving path, such that the host vehicle reaches a destination without colliding with an external object, based on surrounding environmental information. The surrounding environment may continuously change while the vehicle drives. The vehicle control apparatus should be able to update the driving path in real time in response to such a change.

For example, various types of geometric path generation algorithms may be used to generate a driving path. However, the path generation algorithm according to certain implementations has limitations and may not reflect constraints of vehicle kinematics and have difficulty generating an avoidance path for preventing a collision with an external object. In addition, it is somewhat difficult for the path generation algorithm to ensure continuity with respect to a path which was generated in a previous cycle. Some of these challenges may hinder the path generation algorithm from generating a suitable path in real time.

SUMMARY

The present disclosure has been made to address the above-mentioned problems occurring j in some implementations while advantages achieved by those implementations are maintained intact.

An aspect of the present disclosure provides a vehicle control apparatus for sufficiently considering a surrounding environment or a driving state of a host vehicle, which rapidly changes in a driving process of the host vehicle to generate a continuous driving path and a method thereof.

Another aspect of the present disclosure provides a vehicle control apparatus for previously identifying a boundary path and then generating a driving path within a range of the boundary path to prevent a collision with an external object to provide a user with a stable and reliable driving experience and a method thereof.

Another aspect of the present disclosure provides a vehicle control apparatus for fitting a driving path generated optimization method using a numerical (e.g., curvature optimization, overshoot optimization, boundary optimization, or the like) to generate an optimal expected driving path, even if a physical constraint of the vehicle or the generated driving path does not meet constraints, and a method thereof.

Another aspect of the present disclosure provides a vehicle control apparatus for generating a driving path in a next cycle using a required steering angle (or required curvature) according to the finally generated expected driving path to ensure continuity with a previous path and providing constraints for a steering angle, the amount of change in steering, or the like based on a vehicle kinematics model to provide a user with a stable driving experience and a method thereof.

The technical problems to be addressed by the present disclosure are not limited to the aforementioned problems, and any other technical problems not mentioned herein will be clearly understood from the following description by those skilled in the art to which the present disclosure pertains.

According to one or more example embodiments of the present disclosure, a vehicle control apparatus may include: a sensor; memory storing at least one instruction; and a controller operatively coupled with the sensor and the memory. The at least one instruction may be configured to, when executed by the controller, cause the vehicle control apparatus to: obtain, using the sensor: environmental information about a surrounding environment of a vehicle that is driving, and driving information of the vehicle; determine a plurality of boundary paths for driving of the vehicle, based on at least one of the environmental information, the driving information, or a maximum drivable curvature of the vehicle; determine, based on a curvature for the vehicle to drive to a destination, an expected driving path; determine, based on the expected driving path being located within the plurality of boundary paths, a steering angle for following the expected driving path; update the expected driving path based on the determined steering angle, the environmental information, and the driving information; and control, based on the updated expected driving path, the vehicle.

The at least one instruction may be configured to, when executed by the controller, cause the vehicle control apparatus to determine the expected driving path by: determining the expected driving path further based on at least one of a driving distance in which the vehicle moves from a specified point of a lane, a lateral offset from a center line of the lane to a center of gravity of the vehicle, a yaw rate of the vehicle, a driving speed of the vehicle, or acceleration of the vehicle, wherein the yaw rate is identified with respect to a direction of the center line.

The at least one instruction may be configured to, when executed by the controller, cause the vehicle control apparatus to determine the expected driving path by: determining the expected driving path further based on at least one of: at least one of a real-time lateral offset of the vehicle, a real-time heading of the vehicle, or a real-time curvature of a lane with respect to a specified point of the lane to a center of gravity of the vehicle, or an expected lateral offset of the vehicle, an expected heading of the vehicle, or an expected curvature of the lane with respect to the specified point to the center of gravity, wherein the expected lateral offset, the expected heading, and the expected curvature are determined with respect to a target point.

The driving information may include heading information, and wherein the at least one instruction is configured to, when executed by the controller, cause the vehicle control apparatus to update the expected driving path by: updating the heading information, based on at least one of the determined steering angle, a slip angle at which the vehicle rotates with respect to a driving direction of the vehicle, a distance from a center of gravity of the vehicle to front wheels of the vehicle, a distance from the center of gravity of the vehicle to rear wheels of the vehicle, or a driving speed of the vehicle; and updating, based on the updated heading information, the expected driving path.

The at least one instruction may be configured to, when executed by the controller, cause the vehicle control apparatus to update the heading information by: determining the updated heading information to be inversely proportional to at least one of the distance from the center of gravity of the vehicle to the front wheels of the vehicle or the distance from the center of gravity of the vehicle to the rear wheels of the vehicle.

The driving information may include curvature information, and wherein the at least one instruction is configured to, when executed by the controller, cause the vehicle control apparatus to update the expected driving path by: updating the curvature information, based on at least one of the determined steering angle, a slip angle at which the vehicle rotates with respect to a driving direction of the vehicle, a distance from a center of gravity of the vehicle to front wheels of the vehicle, a distance from the center of gravity of the vehicle to rear wheels of the vehicle, or a driving speed of the vehicle; and updating, based on the updated curvature information, the expected driving path.

The at least one instruction may be configured to, when executed by the controller, cause the vehicle control apparatus to update the curvature information by: determining the updated curvature information to be inversely proportional to the distance from the center of gravity of the vehicle to the rear wheels of the vehicle.

The at least one instruction may be configured to, when executed by the controller, cause the vehicle control apparatus to determine the expected driving path by: identifying, based on the environmental information, at least one external object within a threshold distance from the vehicle; determining the plurality of boundary paths, further based on a probability of a collision with the at least one external object; and determining one of the plurality of boundary paths to be the expected driving path, based on at least one of: the expected driving path being located the plurality of boundary paths, or a determination that the vehicle is on a collision course with the at least one external object.

The at least one instruction may be configured to, when executed by the controller, further cause the vehicle control apparatus to: determine, based on oriented bounding boxes (OBBs) corresponding to the vehicle and the at least one external object, the probability of the collision between the vehicle and the at least one external object.

The at least one instruction may be configured to, when executed by the controller, cause the vehicle control apparatus to update the expected driving path by: adjusting, based on a maximum steering angle of the vehicle and an allowable steering angle change amount range, the determined steering angle; and updating, based on the adjusted steering angle, the expected driving path.

According to one or more example embodiments of the present disclosure, a vehicle control method may include: obtaining, by a controller and using a sensor: environmental information about a surrounding environment of a vehicle that is driving, and driving information of the vehicle; determining, by the controller, a plurality of boundary paths for driving of the vehicle, based on at least one of the environmental information, the driving information, or a maximum drivable curvature of the vehicle; determining, by the controller and based on a curvature for the vehicle to drive to a destination, an expected driving path; determining, by the controller and based on the expected driving path being located within the plurality of boundary paths, a steering angle for following the expected driving path; updating, by the controller, the expected driving path based on the determined steering angle, the environmental information, and the driving information; and controlling, by the controller and based on the updated expected driving path, the vehicle.

Determining the expected driving path may include: determining, by the controller, the expected driving path further based on at least one of a driving distance in which the vehicle moves from a specified point of a lane, a lateral offset from a center line of the lane to a center of gravity of the vehicle, a yaw rate of the vehicle, a driving speed of the vehicle, or acceleration of the vehicle, wherein the yaw rate is identified with respect to a direction of the center line.

Determining the expected driving path may include: determining the expected driving path further based on at least one of: at least one of a real-time lateral offset of the vehicle, a real-time heading of the vehicle, or a real-time curvature of a lane with respect to a specified point of the lane to a center of gravity of the vehicle, or an expected lateral offset of the vehicle, an expected heading of the vehicle, or an expected curvature of the lane with respect to the specified point to the center of gravity, wherein the expected lateral offset, the expected heading, and the expected curvature are determined expected with respect to a target point.

The driving information may include heading information, and wherein the updating of the expected driving path comprises: updating, by the controller, the heading information, based on at least one of the determined steering angle, a slip angle at which the vehicle rotates with respect to a driving direction of the vehicle, a distance from a center of gravity of the vehicle to front wheels of the vehicle, a distance from the center of gravity of the vehicle to rear wheels of the vehicle, or a driving speed of the vehicle; and updating, by the controller and based on the updated heading information, the expected driving path.

Updating the heading information may include: determining, by the controller, the updated heading information to be inversely proportional to at least one of the distance from the center of gravity of the vehicle to the front wheels of the vehicle or the distance from the center of gravity of the vehicle to the rear wheels of the vehicle.

The driving information may include curvature information, and wherein the updating of the expected driving path comprises: updating, by the controller, the curvature information, based on at least one of the determined steering angle, a slip angle at which the vehicle rotates with respect to a driving direction of the vehicle, a distance from a center of gravity of the vehicle to front wheels of the vehicle, a distance from the center of gravity of the vehicle to rear wheels of the vehicle, or a driving speed of the vehicle; and updating, by the controller based on the updated curvature information, the expected driving path.

Updating the curvature information may include: determining, by the controller, the updated curvature information to be inversely proportional to the distance from the center of gravity of the vehicle to the rear wheels of the vehicle.

Determining the expected driving path may include: identifying, by the controller and based on the environmental information, at least one external object within a threshold distance from the vehicle; determining, by the controller, the plurality of boundary paths, further based on a probability of a collision with the at least one external object; and determining one of the plurality of boundary paths to be the expected driving path, based on at least one of: the expected driving path being located outside the plurality of boundary paths, or a determination that the vehicle is on a collision course with the at least one external object.

The vehicle control method may further include: determining, by the controller and based on oriented bounding boxes (OBBs) corresponding to the vehicle and the at least one external object, the probability of the collision between the vehicle and the at least one external object.

Updating the expected driving path may include: adjusting, by the controller and based on a maximum steering angle of the vehicle and an allowable steering angle change amount range, the determined steering angle; and updating, by the controller and based on the adjusted steering angle, the expected driving path.

BRIEF DESCRIPTION OF THE DRAWINGS

The above and other objects, features and advantages of the present disclosure will be more apparent from the following detailed description taken in conjunction with the accompanying drawings.

Figure 1:
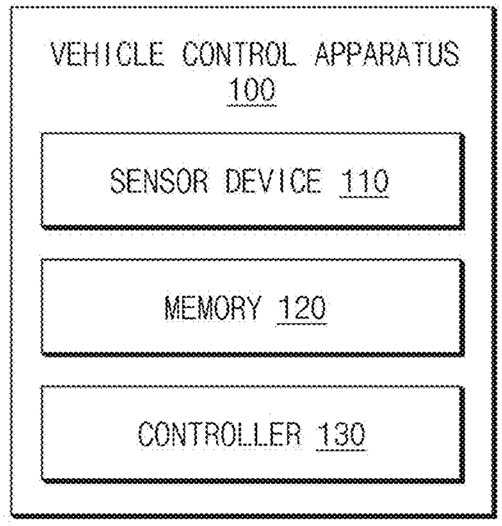
FIG. 1 is a block diagram illustrating components of a vehicle control apparatus according to an embodiment of the present disclosure.

With regard to description of drawings, the same or similar denotations may be used for the same or similar components.

DETAILED DESCRIPTION

Hereinafter, some embodiments of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating components of a vehicle control apparatus according to an embodiment of the present disclosure.

According to an embodiment, a vehicle control apparatus 100 may include a sensor 110, a memory 120, and/or a controller 130. The components of the vehicle control apparatus 100, which are shown in FIG. 1, are illustrative, and embodiments of the present disclosure are not limited thereto. For example, the vehicle control apparatus 100 may further include components (e.g., at least one of a communication device, an interface, a display, or a notification device, or any combination thereof) which are not shown in FIG. 1.

According to an embodiment, the sensor 110 may obtain various pieces of information about a vehicle (e.g., a host vehicle).

For example, the sensor 110 may include at least one sensor including at least one of a camera, radio detection and ranging (radar), or light detection and ranging (LiDAR), or any combination thereof.

For example, the sensor 110 may obtain environmental information (e.g., surroundings information) about an environment in which the host vehicle is driving and/or driving information of the host vehicle.

As an example, the sensor 110 may obtain environmental information about an external object (e.g., at least one of a person, another vehicle, a building, or a structure, or any combination thereof) present around the host vehicle. The environmental information may include, for example, information about a lane in which the host vehicle is driving (e.g., a curvature of the lane, a lateral distance between a center (e.g., a center line) of the lane and a center of gravity of the host vehicle, a relative position of the host vehicle on the lane, a distance from an adjacent lane, or the like).

As an example, the sensor 110 may obtain information about at least one of a real-time driving speed of a host vehicle, real-time driving acceleration of the host vehicle, a driving direction of the host vehicle, a yaw rate of the host vehicle, a driving distance of the host vehicle, or a driving history of the host vehicle, or any combination thereof.

The yaw rate may be, for example, a parameter indicating a degree of a heading of the host vehicle, which is identified about a specified axis (e.g., an axis along which the lane progresses).

The driving distance may be, for example, a parameter indicating a distance (or an arc-length) in which the host vehicle drives from a specified point (e.g., a point at which the driving distance is set to 0) to a real-time position of the host vehicle.

As an example, the sensor 110 may obtain information about at least one of a driving speed of another vehicle adjacent to (e.g., within a threshold distance from) the host vehicle, driving acceleration of the other vehicle, a driving direction of the other vehicle, a driving path of the other vehicle, a type of a road, a state of the road, a gradient of the road, or a separation distance between the host vehicle and the other vehicle, or any combination thereof.

According to an embodiment, the memory 120 may store a command or data. For example, the memory 120 may store one or more instructions, when executed by the controller 130, causing the vehicle control apparatus 100 to perform various operations.

For example, the memory 120 and the controller 130 may be implemented as one chipset. The controller 130 may include at least one of a communication processor or a modem.

For example, the memory 120 may store various pieces of information associated with the vehicle control apparatus 100. As an example, the memory 120 may store information about an operation history of the controller 130. As an example, the memory 120 may store information associated with states and/or operations of components (e.g., at least one of an engine control unit (ECU), the sensor 110, or the controller 130, or any combination thereof) of the host vehicle.

For example, the memory 120 may include different types of a plurality of storage devices. For example, the memory 120 may include at least one of a random-access memory (RAM) or an embedded multi-media card (eMMC), or any combination thereof.

As an example, the RAM may temporarily store data (e.g., data about a driving path for each of a just previous cycle and a real-time cycle) about an operation of the vehicle control apparatus 100 and/or the host vehicle which is a control target of the vehicle control apparatus 100. The RAM may include, for example, at least one buffer. The vehicle control apparatus 100 may store, for example, at least one node divided by dividing pieces of data collected (or identified) while performing autonomous driving control for the host vehicle by a unit time in the RAM.

As an example, the eMMC may include a built-in multimedia card. The eMMC may store, for example, data for a longer duration than the RAM. The eMMC may be implemented as, for example, a separate memory chip independent of the RAM.

According to an embodiment, the controller 130 may be operatively coupled with the sensor 110 and/or the memory 120. For example, the controller 130 may control operations of the sensor 110 and/or the memory 120.

For example, the controller 130 may obtain environmental information about an environment in which the host vehicle is driving and driving information of the host vehicle, using the sensor 110.

As an example, the controller 130 may obtain at least one of map information of an area where the host vehicle is driving, information of the lane (e.g., relative position information between the center (e.g., center line) of the lane and the host vehicle), a steering angle of the host vehicle, a driving speed of the host vehicle, or acceleration of the host vehicle, or any combination thereof.

For example, the controller 130 may identify one or more boundary paths for driving of the host vehicle, using at least one of environmental information, driving information, a maximum drivable curvature (e.g., maximum steering angle) of a vehicle (e.g., the host vehicle), or any combination thereof.

As an example, the controller 130 may generate one or more boundary paths for avoiding a collision with an external object and may then identify (or generate) an expected driving path within a range of the one or more boundary paths.

As an example, a boundary path may represent a path generated according to a maximum curvature along which the host vehicle is drivable. A boundary path may be a path configured to prevent a collision with the external object. For example, a first boundary path may represent a maximum curvature (e.g., a boundary) along which a vehicle could drive to the left while avoiding collision with the external object, and a second boundary path may represent a maximum curvature (e.g., a boundary) along which the vehicle could drive to the right while avoiding collision with the external object. The two boundary paths may delineate the two edges (e.g., boundaries) of a range of paths that the vehicle may travel in. In other words, the vehicle may travel within the two boundary paths, one on each side.

As an example, the controller 130 may identify at least one external object adjacent to (e.g., within a threshold distance from) the host vehicle based on the environmental information and may identify the one or more boundary paths, further using a possibility (e.g., a probability) of a collision with the external object. The controller 130 may determine, for example, a possibility (e.g., a probability) of a collision between the host vehicle and the external object, using an oriented bounding box (OBB) corresponding to each of the host vehicle and the external object.

The description of the one or more boundary paths may be defined in detail in a description of FIG. 5, which will be described below.

For example, the controller 130 may identify an expected driving path based on required curvature required for the host vehicle to drive to a destination and may determine whether the expected driving path is included in the one or more boundary paths.

As an example, the controller 130 may identify an expected driving path necessary for the host vehicle to drive to the destination based on real-time driving information of the host vehicle. To identify the expected driving path, the controller 130 may use the required curvature. In other words, the controller 130 may identify an expected driving path in the form of a curve corresponding to the required curvature.

As an example, the controller 130 may identify the expected driving path, using at least one of a driving distance (or an arc-length) in which the host vehicle moves from a specified point (e.g., an initial point) of the lane, a lateral offset from the center (e.g., center line) of the lane to the center of gravity of the host vehicle, a yaw rate (or an amount of heading) of the host vehicle, which is identified with respect to a direction of the center line, a driving speed of the host vehicle, or acceleration of the host vehicle, or any combination thereof.

As an example, the identified expected driving path may be implemented in the form of an nth degree polynomial (e.g., a 5th degree polynomial) including the above-mentioned parameters. For example, the controller 130 may identify the nth degree polynomial corresponding to the expected driving path based on information according to a real-time position of the host vehicle and information expected with respect to a target point. The information according to the real-time position may include, for example, a real-time lateral offset of the host vehicle, a real-time heading of the host vehicle, and real-time curvature of the lane, from the specified point of the lane to the center of gravity of the host vehicle. The information expected with respect to the target point may include, for example, an expected lateral offset of the host vehicle, an expected heading of the host vehicle, and expected curvature of the lane, from the specified point expected with respect to the target point to the center of gravity.

For example, if the expected driving path is included in (e.g., located within) the one or more boundary paths, the controller 130 may identify a required steering angle for following the expected driving path. As an example, the controller 130 may determine that it is safe to perform driving control according to the expected driving path, if the expected driving path is included in the one or more boundary paths, and may identify a required steering angle to perform driving control along the expected driving path. To identify the required steering angle, the controller 130 may use, for example, a curvature of the expected driving path.

For example, if the expected driving path is not included in the one or more boundary paths or the host vehicle drives based on the expected driving path and if it is identified that the host vehicle and the external object will collide with each other (e.g., it is determined that the host vehicle is on a collision course with the external object), the controller 130 may identify (e.g., determine) the one of the one of more boundary paths as the expected driving path. In other words, the controller 130 may set a boundary path corresponding to maximum drivable curvature or threshold curvature for preventing a collision as the expected driving path.

For example, the controller 130 may update the expected driving path, based on the required steering angle, the environmental information, and the driving information.

As an example, the controller 130 may update the expected driving path in real time in the process of performing driving control for the host vehicle, using the required steering angle identified by means of the expected driving path. The controller 130 may update the expected driving path using the required steering angle identified in the immediately previous cycle, thus ensuring continuity between the expected driving path updated in real time and the expected driving path generated in the just previous cycle.

As an example, the controller 130 may update heading information included in the driving information, using at least one of the required steering angle, a slip angle at which the body of the host vehicle rotates with respect to the driving direction of the host vehicle, distances from the center of gravity of the host vehicle to front wheels and rear wheels, or the driving speed of the host vehicle, or any combination thereof. The controller 130 may identify, for example, the distances from the center of gravity of the host vehicle to the front wheels and the rear wheels and the heading information to be inversely proportional to each other. The controller 130 may identify update, for example, the expected driving path, using the updated heading information.

As an example, the controller 130 may update curvature information included in the driving information, using at least one of the required steering angle, a slip angle at which the body of the host vehicle rotates with respect to the driving direction of the host vehicle, distances from the center of gravity of the host vehicle to the front wheels and the rear wheels, or the driving speed of the host vehicle, or any combination thereof. The controller 130 may identify, for example, the distance from the center of gravity of the host vehicle to the rear wheels and the curvature information to be inversely proportional to each other. The controller 130 may identify update, for example, the expected driving path, using the updated curvature information.

For example, the controller 130 may update the expected driving path, further using a constraint for driving control of the host vehicle.

As an example, the controller 130 may adjust a value of the required steering angle identified to follow the expected driving path, based on the maximum steering angle and an allowable steering angle change amount range. The controller 130 may update the expected driving, using the adjusted required steering angle.

For example, the controller 130 may control the host vehicle, based on the updated expected driving path.

As an example, the controller 130 may perform autonomous driving control for the host vehicle to follow the updated expected driving path.

Figure 2:
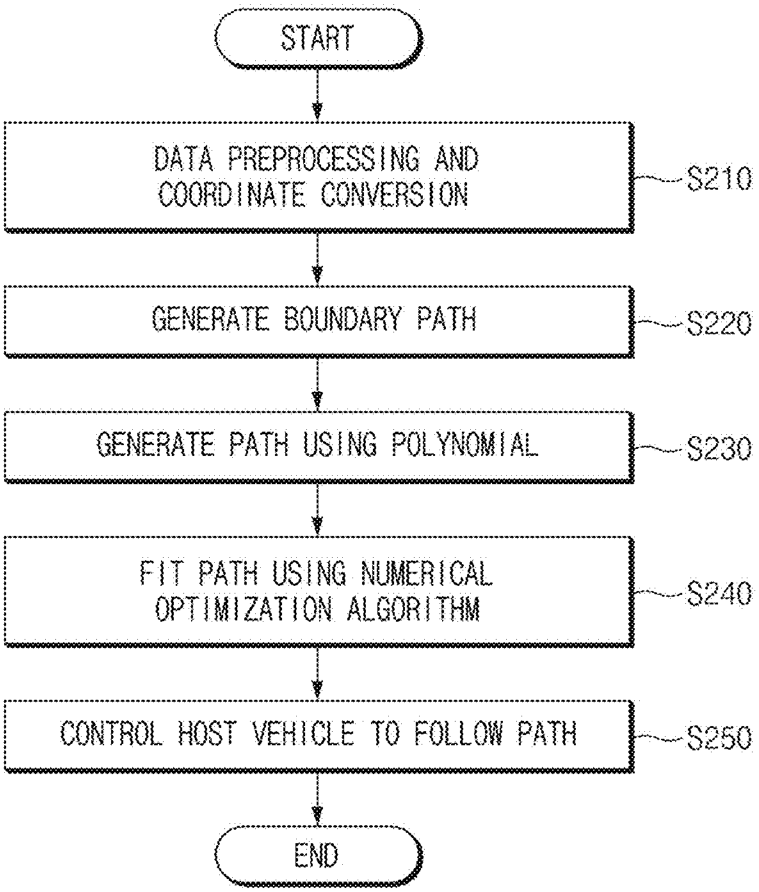
FIG. 2 is a flowchart of a vehicle control method according to an embodiment of the present disclosure.

FIG. 2 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 2. For example, at least some of components (e.g., a sensor 110, a memory 120, and/or a controller 130 of FIG. 1) included in the vehicle control apparatus may be configured to perform operations of FIG. 2.

Operations in S210 to S250 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 2, may be briefly described or omitted.

According to an embodiment, in S210, the vehicle control apparatus may perform a data preprocessing operation and a coordinate conversion operation.

For example, the vehicle control apparatus may identify pieces of information corresponding to an initial state (or a real-time state) and an end state (or a state expected assuming that a host vehicle arrives at a destination), based on environmental information and driving information of the host vehicle, which are obtained using a sensor.

For example, the vehicle control apparatus may identify coordinates corresponding to the state information of the host vehicle, using the pieces of identified information. The coordinates may include, for example, coordinate data according to a curvilinear coordinate system (e.g., curvilinear coordinates).

As an example, coordinate data according to the initial state may include a driving distance (or an arc-length) in which the host vehicle moves from a specified point of a lane, a real-time lateral offset from a center of the lane (e.g., a center line) of the lane to the center of gravity of the host vehicle, a yaw rate of the host vehicle, which is identified with respect to a direction of the center line, a driving speed of the host vehicle, and acceleration of the host vehicle.

As an example, coordinate data according to the end state may include a driving distance (or an arc-length) expected for the host vehicle to move from the specified point of the lane to the destination, an expected lateral offset from the center (e.g., the center line) of the lane to the center of gravity of the host vehicle, a yaw rate of the host vehicle, which is expected with respect to the direction of the center line, a driving speed of the host vehicle, and acceleration of the host vehicle.

As an example, the vehicle control apparatus may convert a real-time required steering angle of the host vehicle into required curvature, in the preprocessing operation process according to S210. The vehicle control apparatus may generate one or more boundary paths according to S220 based on the required curvature.

According to an embodiment, in S220, the vehicle control apparatus may generate the one or more boundary paths.

For example, the vehicle control apparatus may identify the one or more boundary paths, within which a driving path from a current position of the vehicle to a destination of the vehicle may be determined.

For example, the vehicle control apparatus may identify a curvature range corresponding to a range in which an external object and the host vehicle do not collide with each other and may generate the one or more boundary paths corresponding to each of a maximum value and a minimum value included in the curvature range.

According to an embodiment, in S230, the vehicle control apparatus may generate a path using a polynomial.

For example, the vehicle control apparatus may generate an expected driving path included in (e.g., located within) the one or more boundary paths.

According to an embodiment, in S240, the vehicle control apparatus may fit the generated path, using numerical optimization algorithm.

For example, the vehicle control apparatus may apply an algorithm, such as overshoot optimization, smoothing, or curvature optimization, to the generated expected driving path to optimize the expected driving path, based on various types of numerical optimization algorithms.

According to an embodiment, in S250, the vehicle control apparatus may control the host vehicle to follow the expected driving path.

For example, while controlling the host vehicle, the vehicle control apparatus may continuously update the expected driving path using a required steering angle required to control the host vehicle in real time.

Figure 3:
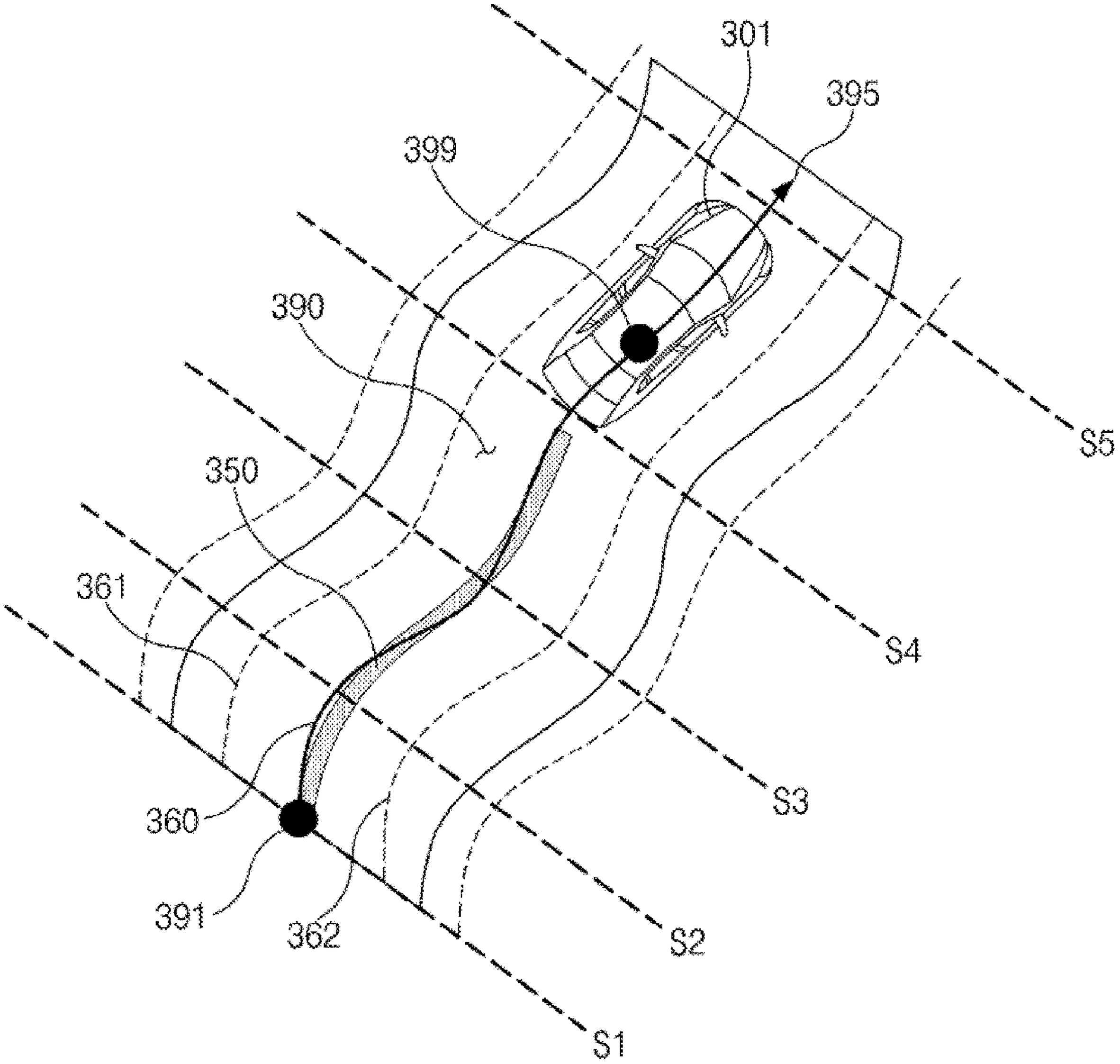
FIG. 3 is an operational conceptual diagram of a vehicle control method according to an embodiment of the present disclosure.

FIG. 3 is an operational conceptual diagram of a vehicle control method according to an embodiment of the present disclosure.

According to an embodiment, a vehicle control apparatus (e.g., a vehicle control apparatus 100 of FIG. 1) may identify an expected driving path corresponding to a polynomial generated using driving information of a host vehicle 301 and environmental information.

For example, the vehicle control apparatus may extract three-dimensional (3D) coordinate data, based on information about a lane 390 in which the host vehicle 301 is driving and real-time driving information of the host vehicle 301. The extracted (or converted) coordinates may be, for example, coordinates based on a curvilinear coordinate system.

For example, the vehicle control apparatus may extract coordinate data including a driving distance in which the host vehicle 301 moves from a specified point 391. As an example, the driving distance may be a length (or an arc-length) of the driving path 360 along which the host vehicle 301 drives in the lane 390.

As an example, if there is the host vehicle 301 on an axis corresponding to S1, the driving distance may be 0.

As an example, if the host vehicle 301 continues driving along axes according to S2, S3, S4, and S5, the driving distance may continue increasing.

For example, the vehicle control apparatus may extract coordinate data including a lateral offset from a center of gravity 399 of the host vehicle 301 to a center line 350 of the lane 390.

As an example, as the center of gravity 399 of the host vehicle 301 gets closer to a first path 361 and further away from the center line 350, the lateral offset may increase from 0 to 1.

As an example, as the center of gravity 399 of the host vehicle 301 gets closer to a second path 362 and further away from the center line 350, the lateral offset may decrease from 0 to −1.

For example, the vehicle control apparatus may extract coordinate data including a yaw rate of the host vehicle 301, which is with respect to a direction 395 the center line 350 of the lane 390 faces.

For example, the coordinate data includes a driving speed and acceleration of the host vehicle 301. However, this is illustrative and embodiments of the present disclosure are not limited thereto.

For example, the vehicle control apparatus may obtain an nth degree polynomial (e.g., a 5th degree polynomial) corresponding to the driving path of the host vehicle 301, based on the coordinate data including the above-mentioned parameters. An independent variable of the nth degree polynomial may be a driving distance in which the host vehicle 301 moves from the specified point 391. A polynomial of the driving path may be defined as Equation 1 below. The polynomial of the driving path may be provided by, for example, Equations 2 to 6 below.

$$n(s) = c_5 s^5 + c_4 s^4 + c_3 s^3 + c_2 s^2 + c_1 s + c_0 \quad \text{[Equation 1]}$$

$$J(s) = M_1(s)c_{012} + M_2(s)c_{345} = \begin{bmatrix} curv \\ phi \\ n \end{bmatrix} \quad \text{[Equation 2]}$$

For example, curv may be the curvature, phi may be the heading of the host vehicle 301, and n may be defined as the polynomial of the driving path.

$$M_1(s) = \begin{bmatrix} s^2 & s & 1 \\ 2s & 1 & 0 \\ 2 & 0 & 0 \end{bmatrix}, M_2(s) = \begin{bmatrix} s^5 & s^4 & s^3 \\ 5s^4 & 4s^3 & 3s^2 \\ 20s^3 & 12s^2 & 6s^1 \end{bmatrix} \quad \text{[Equation 3]}$$

$$c_{012} = \begin{bmatrix} c_2 \\ c_1 \\ c_0 \end{bmatrix}, c_{345} = \begin{bmatrix} c_5 \\ c_4 \\ c_3 \end{bmatrix} \quad \text{[Equation 4]}$$

$$c_{012} = M_1(0)^{-1} J(0) \quad \text{[Equation 5]}$$

$$c_{345} = M_2(\tau)^{-1} [J(\tau) - M_1(\tau)c_{012}] \quad \text{[Equation 6]}$$

For example, t may be the driving distance expected for the host vehicle 301 to move from the specified point 391 to the destination.

Figure 4:
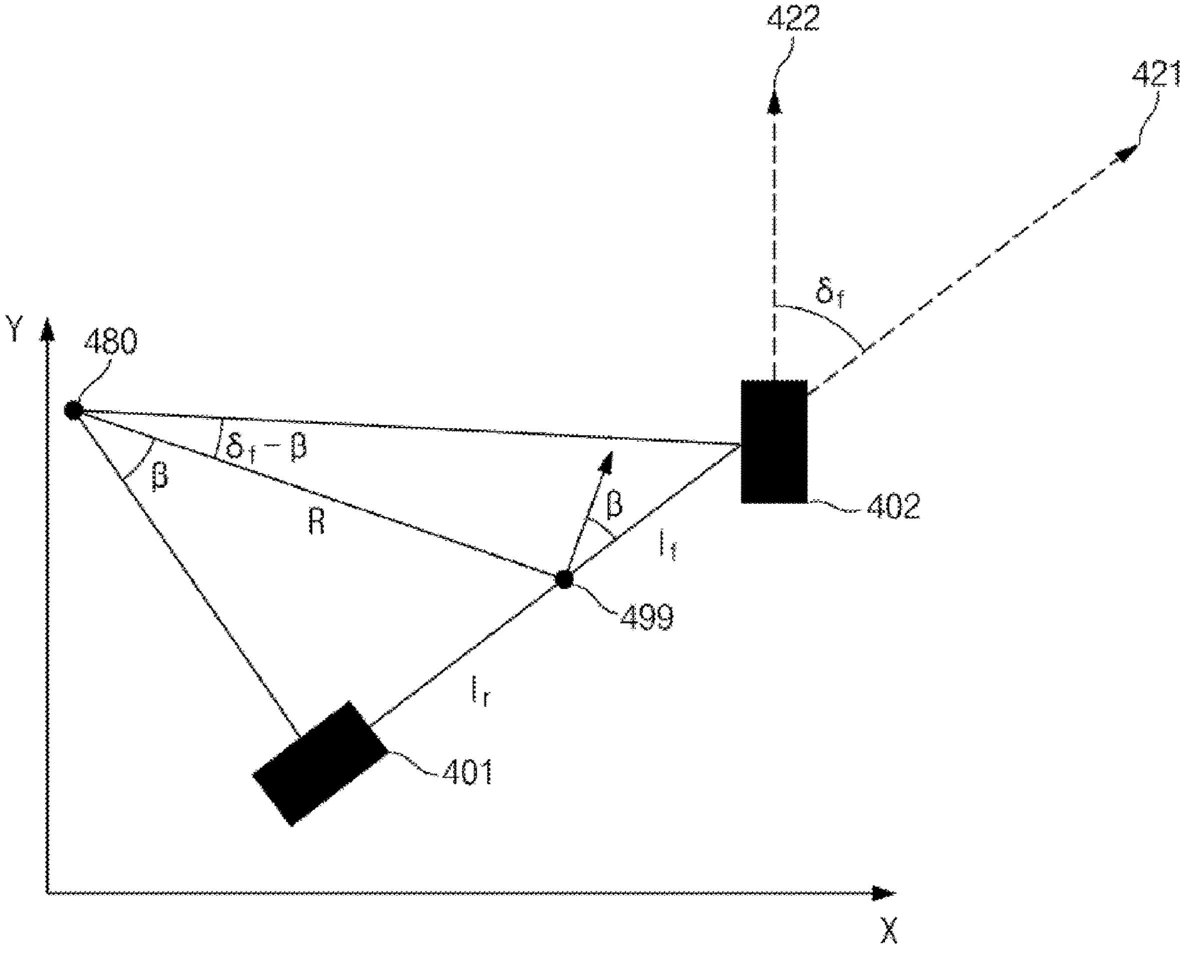
FIG. 4 is an operational conceptual diagram of a vehicle control method according to an embodiment of the present disclosure.

FIG. 4 is an operational conceptual diagram of a vehicle control method according to an embodiment of the present disclosure.

According to an embodiment, a vehicle control apparatus (e.g., a vehicle control apparatus 100 of FIG. 1) may identify input data including a yaw rate and curvature, based on a kinematic model identified with respect to a rear wheel 401 and a front wheel 402 of a host vehicle, and may update an expected driving path based on the identified input data.

According to an embodiment, FIG. 4 illustrates a table for describing a kinematic model provided if looking at the rear wheel 401 and the front wheel 402 of the host vehicle in a top view scheme. Furthermore, it is assumed that the steering angle of the rear wheel 401 of the host vehicle according to the kinematic model of FIG. 4 is 0.

For example, the vehicle control apparatus may identify a first length $l_r$ between the rear wheel 401 of the host vehicle and a center of gravity 499 of the host vehicle and a second length $l_f$ between the front wheel 402 and the center of gravity 499.

For example, the vehicle control apparatus may identify a front-wheel steering angle of which is a steering angle of the front wheel 402. The front-wheel steering angle of may be, for example, an angle between a driving direction 421 in which the host vehicle drives immediately before steering control for the host vehicle is performed and a front-wheel direction 422 the front wheel 402 faces.

For example, as the front wheel 402 rotates by the front-wheel steering angle of based on the steering control, the body of the host vehicle may also rotate. At this time, the vehicle control apparatus may identify a body rotation angle β (or a body side slip angle) of the host vehicle.

For example, the vehicle control apparatus may identify a driving path of the host vehicle, which is expected for the front wheel 402 to rotate by the front-wheel steering angle of to continue driving. For example, the expected driving path may be a circle. The vehicle control apparatus may identify a radius R between a center 480 of the expected circle and the center of gravity 499 of the host vehicle.

For example, the vehicle control apparatus may identify a correlation between the above-mentioned parameters, using an equation model based on Equations 7 to 11 below.

$$\frac{\sin(\delta_f - \beta)}{l_f} = \frac{\sin\left(\frac{\pi}{2} - \delta_f\right)}{R} \quad \text{[Equation 7]}$$

$$K = \frac{1}{R} = \frac{1}{l_f(\tan(\delta_f)\cos(\beta) - \sin(\beta))} \quad \text{[Equation 8]}$$

$$K = \frac{1}{R} = \frac{1}{l_r(\sin(\beta))} \quad \text{[Equation 9]}$$

$$(l_f + l_r) * \sin(\beta) = \cos(\beta) * (l_r * \tan(\delta_f)) \quad \text{[Equation 10]}$$

$$\beta = \tan^{-1}\left(\frac{\tan(\delta_f)}{l_f + l_r}\right)r \quad \text{[Equation 11]}$$

For example, as described above, the vehicle control apparatus may generate the yaw rate and the curvature based on the identified parameters and the required steering angle $\delta_{des}$ used to control the host vehicle based on the expected driving path generated in the just previous cycle and may update the expected driving path based on the yaw rate and the curvature. The vehicle control apparatus may correct coordinate data according to an initial state based on Equations 12 and 13 below and may update the expected driving path based on the corrected coordinate data.

$$Y = \frac{V}{R} = \frac{V * \tan(\delta_{des}) * \cos\beta}{l_f + l_r} \quad \text{[Equation 12]}$$

-continued $$\beta = \tan^{-1}\left(\frac{\tan(\delta_{des})}{l_f + l_r}\right) \quad K = 1/\text{l\_r} \quad \sin(\beta) \quad \text{[Equation 13]}$$

For example, Y may be the corrected yaw rate, V may be the driving speed of the host vehicle, and K may be the curvature.

Figure 5:
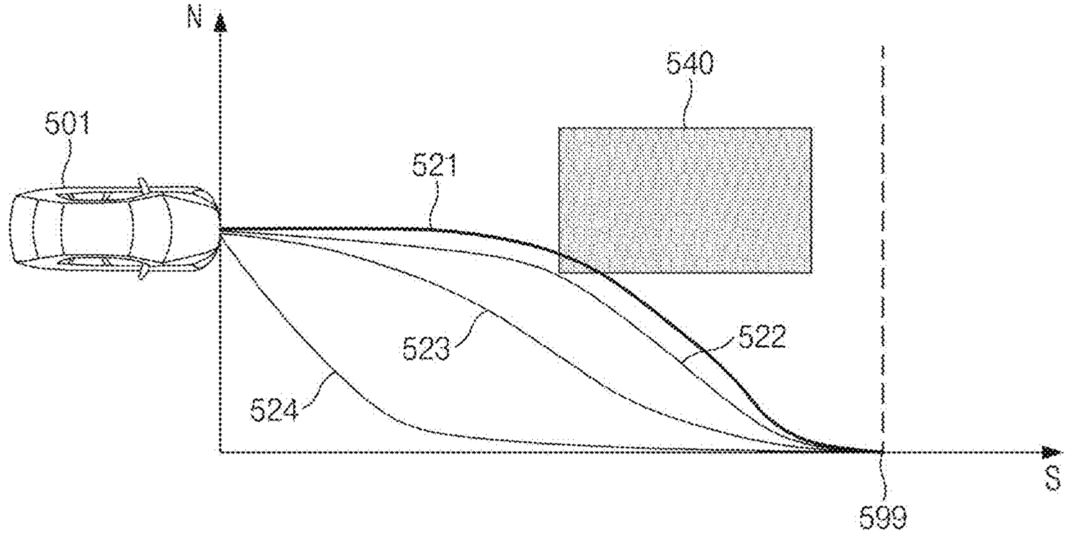
FIG. 5 is an operational conceptual diagram of a vehicle control method according to an embodiment of the present disclosure.

FIG. 5 is an operational conceptual diagram of a vehicle control method according to an embodiment of the present disclosure.

According to an embodiment, a vehicle control apparatus (e.g., a vehicle control apparatus 100 of FIG. 1) may generate one or more boundary paths to generate an expected driving path from a current position of a host vehicle 501 to a destination 599.

For example, the vehicle control apparatus may identify an external object 540 using a sensor (e.g., a sensor 110 of FIG. 1) and may generate the one or more boundary paths for preventing a collision with the external object 540. The vehicle control apparatus may determine, for example, a possibility (e.g., a probability) of a collision, using an oriented bounding box (OBB) corresponding to each of the host vehicle 501 and the external object 540.

For example, if the host vehicle 501 drives along a first path 521, the vehicle control apparatus may identify that a collision with the external object 540 will occur and may identify a second path 522 corresponding to larger curvature than the first path 521 as a first boundary path.

For example, the vehicle control apparatus may identify a fourth path 524 as a second boundary path. The fourth path 524 may be a driving path corresponding to maximum curvature at which the host vehicle 501 is drivable.

For example, the vehicle control apparatus may identify a range within the second path 522 and the fourth path 524 as one or more boundary paths (or a boundary path range).

For example, if the expected driving path is included between the second path 522 and the fourth path 524 (or is included within the one or more boundary paths), the vehicle control apparatus may determine that the host vehicle 501 is safely drivable and may control the host vehicle 501 to follow the expected driving path.

As an example, if the expected driving path is a third path 523, because the expected driving path is included in the one or more boundary paths, the vehicle control apparatus may control the host vehicle 501 to follow the third path 523.

For example, if there is the expected driving path outside the one or more boundary paths, the vehicle control apparatus may set one of the second path 522 or the fourth path 524 as an expected driving path.

Figure 6A:
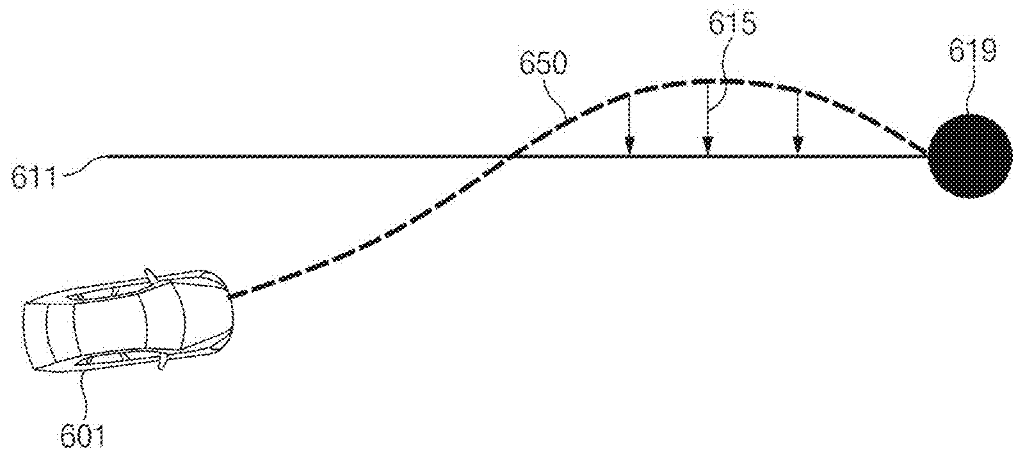
FIG. 6A is a conceptual diagram of applying a numerical optimization algorithm for a driving path according to an embodiment of the present disclosure.
Figure 6B:
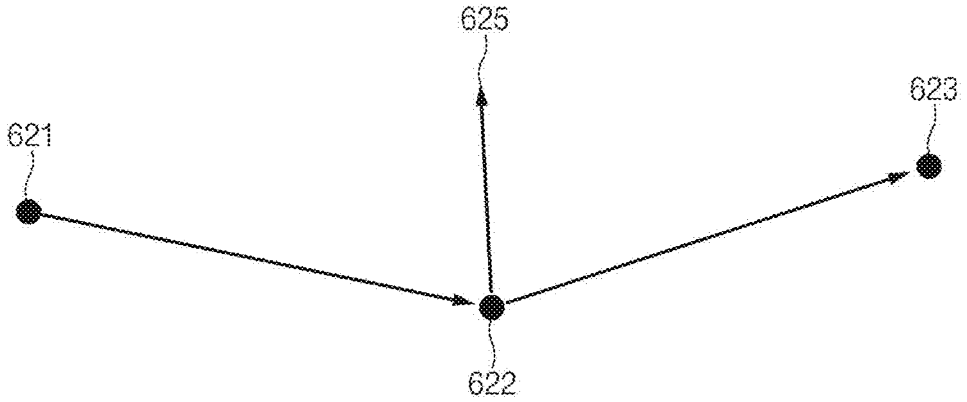
FIG. 6B is a conceptual diagram of applying a numerical optimization algorithm for a driving path according to an embodiment of the present disclosure.
Figure 6C:
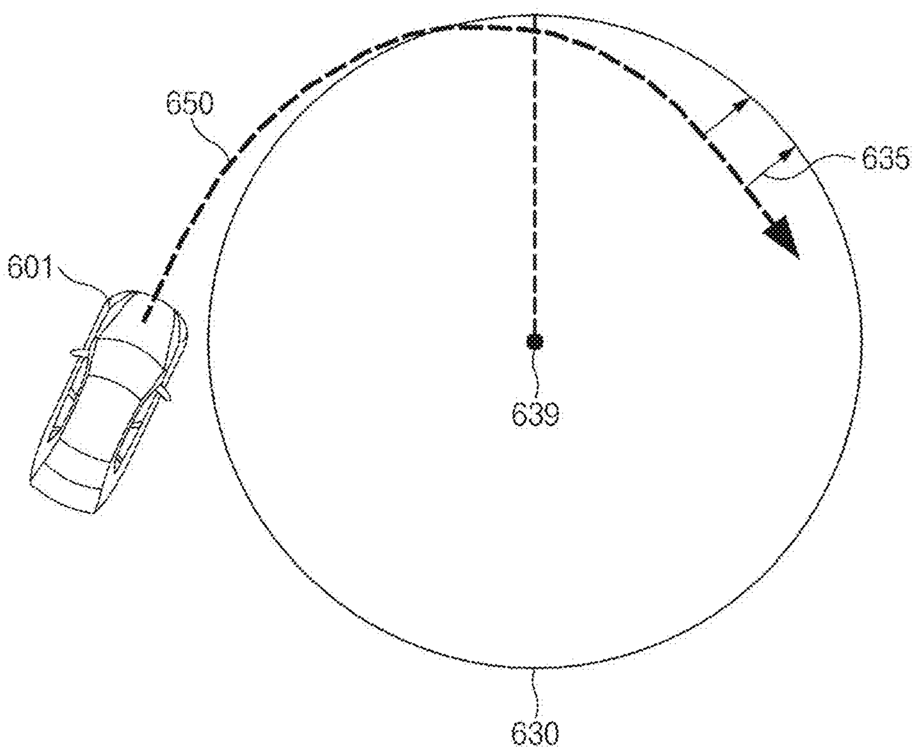
FIG. 6C is a conceptual diagram of applying a numerical optimization algorithm for a driving path according to an embodiment of the present disclosure.

FIG. 6A to FIG. 6C is conceptual diagrams of applying a numerical optimization algorithm for a driving path according to an embodiment of the present disclosure.

According to an embodiment, a vehicle control apparatus (e.g., a vehicle control apparatus 100 of FIG. 1) may correct an expected driving path 650 generated to control a host vehicle 601, by means of a numerical optimization algorithm.

Referring to FIG. 6A, the vehicle control apparatus may identify a specified axis 611 passing through the expected driving path 650 and a destination 619 and may correct a path in an area in which curvature is greater than or equal to a specified value in the expected driving path 650, in a first direction 615 in which curvature becomes small. As a result, the vehicle control apparatus may smooth an overshot path in the expected driving path 650.

Referring to FIG. 6B, according to an embodiment, if identifying an expected driving path for allowing the host vehicle 601 to drive via a first point 621, a second point 622, and a third point 623, the vehicle control apparatus may correct a position of the second point 622 in a second direction 625. As a result, the vehicle control apparatus may smooth the expected driving path.

Referring to FIG. 6C, according to an embodiment, the vehicle control apparatus may identify the expected driving path 650. Thereafter, if continuously controlling the host vehicle 601 at a steering angle at a specified starting point (e.g., a starting point at which the expected driving path 650 is identified), the vehicle control apparatus may identify a circular path 630 along which the host vehicle 601 will drive and a center 639 of the circular path 630. The vehicle control apparatus may correct, for example, a driving path of an area in which the expected driving path 650 deviates from the circular path 630 in a third direction 635. As a result, the vehicle control apparatus may control the host vehicle 601 to be closer to the circular path 630, thus providing a user with a more stable and seamless driving experience.

Figure 7:
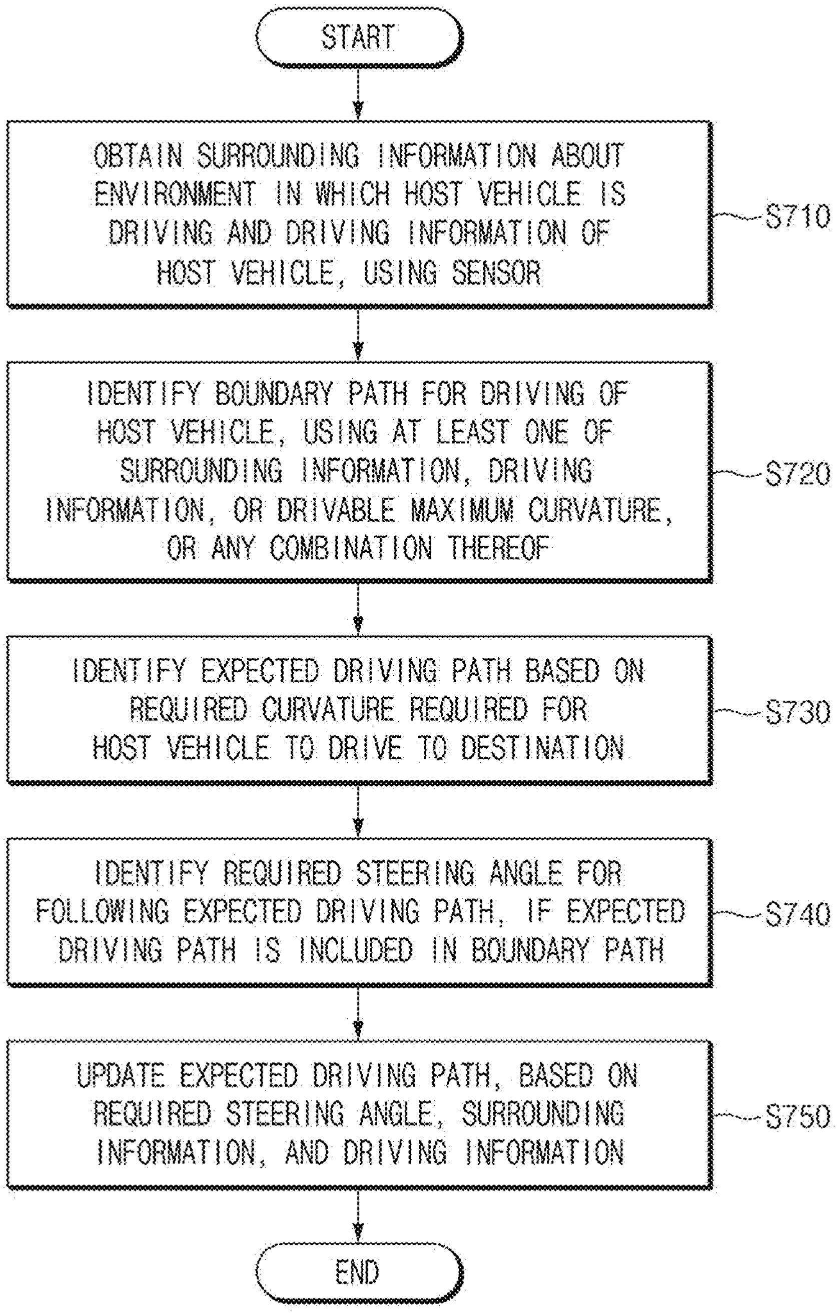
FIG. 7 is a flowchart of a vehicle control method according to an embodiment of the present disclosure.

FIG. 7 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 7. For example, at least some of components (e.g., a sensor 110, a memory 120, and/or a controller 130 of FIG. 1) included in the vehicle control apparatus may be configured to perform operations of FIG. 7.

Operations in S710 to S750 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 7, may be briefly described or omitted.

According to an embodiment, in S710, the vehicle control apparatus may obtain environmental information about an environment in which a host vehicle is driving and driving information of the host vehicle, using a sensor.

According to an embodiment, example, in S720, the vehicle control apparatus may identify one or more boundary paths for driving of the host vehicle, using at least one of the environmental information, the driving information, or maximum drivable curvature of the host vehicle, or any combination thereof.

According to an embodiment, in S730, the vehicle control apparatus may identify an expected driving path based on required curvature required for the host vehicle to drive to a destination.

According to an embodiment, in S740, the vehicle control apparatus may identify a required steering angle for following the expected driving path, if the expected driving path is included in the one or more boundary paths.

According to an embodiment, in S750, the vehicle control apparatus may update the expected driving path, based on the required steering angle, the environmental information, and the driving information.

Figure 8:
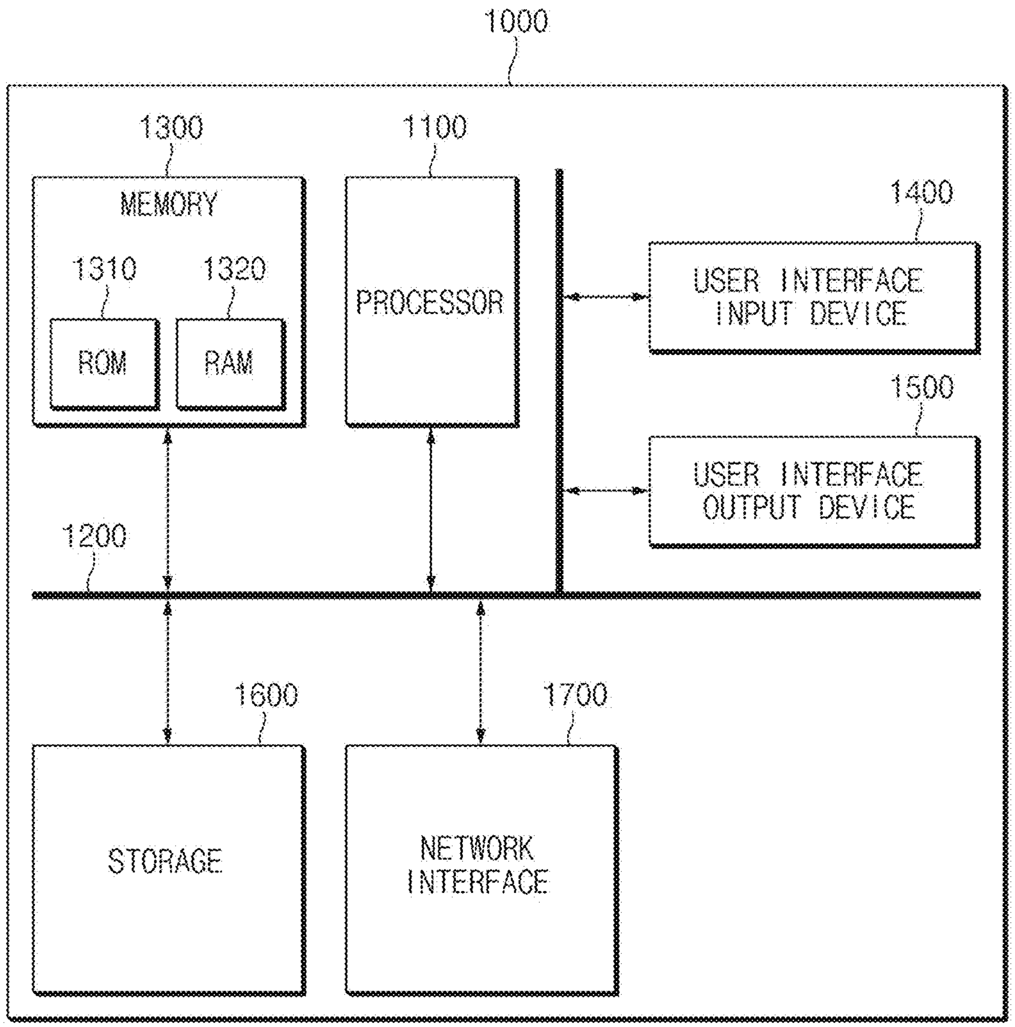
FIG. 8 illustrates a computing system about a vehicle control apparatus or a vehicle control method according to an embodiment of the present disclosure.

FIG. 8 illustrates a computing system associated with a vehicle control apparatus or a vehicle control method according to an embodiment of the present disclosure.

Referring to FIG. 8, a computing system 1000 about the vehicle control apparatus or the vehicle control method may include at least one processor 1100, a memory 1300, a user interface input device 1400, a user interface output device 1500, storage 1600, and a network interface 1700, which are coupled with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the vehicle control apparatus and the method thereof according to an embodiment of the present disclosure.

Embodiments of the present disclosure may sufficiently consider a surrounding environment or a driving state of a host vehicle, which rapidly changes in the driving process of the host vehicle, to generate a continuous driving path.

Embodiments of the present disclosure may identify one or more boundary paths first, and may then generate a driving path within a range of the boundary paths to prevent a collision with an external object, thus providing a user with a stable and reliable driving experience.

Embodiments of the present disclosure may fit a driving path generated using a numerical optimization method (e.g., curvature optimization, overshoot optimization, boundary optimization, or the like), thus generating an optimal expected driving path, even if a physical constraint of the vehicle or the generated driving path does not meet constraints.

Embodiments of the present disclosure may generate a driving path in a next cycle using a required steering angle (or required curvature) according to the finally generated expected driving path to ensure continuity with a previous path and may provide constraints for a steering angle, the amount of change in steering, or the like based on a vehicle kinematics model to provide the user with a stable driving experience.

According to an aspect of the present disclosure, a vehicle control apparatus may include a sensor, a memory storing at least one instruction, and a controller operatively coupled with the sensor and the memory. For example, the at least one instruction may be configured to, when executed by the controller, cause the vehicle control apparatus to obtain surrounding information about an environment in which a host vehicle is driving and driving information of the host vehicle, using the sensor, identify a boundary path for driving of the host vehicle, using at least one of the surrounding information, the driving information, or drivable maximum curvature, or any combination thereof, identify an expected driving path based on required curvature required for the host vehicle to drive to a destination, identify a required steering angle for following the expected driving path, if the expected driving path is included in the boundary path, update the expected driving path based on the required steering angle, the surrounding information, and the driving information, and control the host vehicle based on the updated expected driving path.

According to an embodiment, the at least one instruction may be configured to, when executed by the controller, cause the vehicle control apparatus to identify the expected driving path, using at least one of a driving distance in which the host vehicle moves from a specified point of a lane, a lateral offset from a center line of the lane to a center of gravity of the host vehicle, a yaw rate of the host vehicle, the yaw rate being identified with respect to a direction the center line faces, a driving speed of the host vehicle, or acceleration of the host vehicle, or any combination thereof.

According to an embodiment, the at least one instruction may be configured to, when executed by the controller, cause the vehicle control apparatus to identify a polynomial corresponding to the expected driving path, using a real-time lateral offset, a real-time heading, and real-time curvature of the lane, from a specified point of a lane to a center of gravity of the host vehicle, and an expected lateral offset, an expected heading, and expected curvature of the lane, from the specified point to the center of gravity, the expected lateral offset, the expected heading, and the expected curvature being expected with respect to a target point, and perform driving control for the host vehicle using the polynomial.

According to an embodiment, the at least one instruction may be configured to, when executed by the controller, cause the vehicle control apparatus to update heading information included in the driving information, using at least one of the required steering angle, a slip angle at which a body of the host vehicle rotates with respect to a driving direction of the host vehicle, distances from a center of gravity of the host vehicle to front wheels and rear wheels, or a driving speed of the host vehicle, or any combination thereof, and update the expected driving path, using the updated heading information.

According to an embodiment, the at least one instruction may be configured to, when executed by the controller, cause the vehicle control apparatus to identify the updated heading information to be inversely proportional to the distances from the center of gravity of the host vehicle to the front wheels and the rear wheels and update the expected driving path, using the updated heading information.

According to an embodiment, the at least one instruction may be configured to, when executed by the controller, cause the vehicle control apparatus to update curvature information included in the driving information, using at least one of the required steering angle, a slip angle at which a body of the host vehicle rotates with respect to a driving direction of the host vehicle, distances from a center of gravity of the host vehicle to front wheels and rear wheels, or a driving speed of the host vehicle, or any combination thereof, and update the expected driving path, using the updated curvature information.

According to an embodiment, the at least one instruction may be configured to, when executed by the controller, cause the vehicle control apparatus to identify the updated curvature information to be inversely proportional to the distance from the center of gravity of the host vehicle to the rear wheels and update the expected driving path, using the updated curvature information.

According to an embodiment, the at least one instruction may be configured to, when executed by the controller, cause the vehicle control apparatus to identify at least one external object adjacent to the host vehicle based on the surrounding information, identify the boundary path, further using a possibility of a collision with the at least one external object, and identify the boundary path as the expected driving path, if the expected driving path is not included in the boundary path or the host vehicle drives based on the expected driving path and if it is identified that the host vehicle will collide with the at least one external object.

According to an embodiment, the at least one instruction may be configured to, when executed by the controller, cause the vehicle control apparatus to determine a possibility of a collision between the host vehicle and the at least one external object, using an oriented bounding box (OBB) corresponding to each of the host vehicle and the at least one external object.

According to an embodiment, the at least one instruction may be configured to, when executed by the controller, cause the vehicle control apparatus to adjust a value of the required steering angle, based on a maximum steering angle for driving control of the host vehicle and an allowable steering angle change amount range, and update the expected driving path using the adjusted required steering angle.

According to another aspect of the present disclosure, a vehicle control method may include obtaining, by a controller, surrounding information about an environment in which a host vehicle is driving and driving information of the host vehicle, using a sensor, identifying, by the controller, a boundary path for driving of the host vehicle, using at least one of the surrounding information, the driving information, or drivable maximum curvature, or any combination thereof, identifying, by the controller, an expected driving path based on required curvature required for the host vehicle to drive to a destination, identifying, by the controller, a required steering angle for following the expected driving path, if the expected driving path is included in the boundary path, updating, by the controller, the expected driving path based on the required steering angle, the surrounding information, and the driving information, and controlling, by the controller, the host vehicle based on the updated expected driving path.

According to an embodiment, the vehicle control method may further include identifying, by the controller, the expected driving path, using at least one of a driving distance in which the host vehicle moves from a specified point of a lane, a lateral offset from a center line of the lane to a center of gravity of the host vehicle, a yaw rate of the host vehicle, the yaw rate being identified with respect to a direction the center line faces, a driving speed of the host vehicle, or acceleration of the host vehicle, or any combination thereof.

According to an embodiment, the vehicle control method may further include identifying, by the controller, a polynomial corresponding to the expected driving path, using a real-time lateral offset, a real-time heading, and real-time curvature of a lane, from a specified point of a lane to a center of gravity of the host vehicle, and an expected lateral offset, an expected heading, and expected curvature of the lane, from the specified point to the center of gravity, the expected lateral offset, the expected heading, and the expected curvature being expected with respect to a target point, and performing, by the controller, driving control for the host vehicle using the polynomial.

According to an embodiment, the vehicle control method may further include updating, by the controller, heading information included in the driving information, using at least one of the required steering angle, a slip angle at which a body of the host vehicle rotates with respect to a driving direction of the host vehicle, distances from a center of gravity of the host vehicle to front wheels and rear wheels, or a driving speed of the host vehicle, or any combination thereof, and updating, by the controller, the expected driving path, using the updated heading information.

According to an embodiment, the vehicle control method may further include identifying, by the controller, the updated heading information to be inversely proportional to the distances from the center of gravity of the host vehicle to the front wheels and the rear wheels and updating, by the controller, the expected driving path, using the updated heading information.

According to an embodiment, the vehicle control method may further include updating, by the controller, curvature information included in the driving information, using at least one of the required steering angle, a slip angle at which a body of the host vehicle rotates with respect to a driving direction of the host vehicle, distances from a center of gravity of the host vehicle to front wheels and rear wheels, or a driving speed of the host vehicle, or any combination thereof, and updating, by the controller, the expected driving path, using the updated curvature information.

According to an embodiment, the vehicle control method may further include identifying, by the controller, the updated curvature information to be inversely proportional to the distance from the center of gravity of the host vehicle to the rear wheels and updating, by the controller, the expected driving path, using the updated curvature information.

According to an embodiment, the vehicle control method may further include identifying, by the controller, at least one external object adjacent to the host vehicle based on the surrounding information, identifying, by the controller, the boundary path, further using a possibility of a collision with the at least one external object, and identifying the boundary path as the expected driving path, if the expected driving path is not included in the boundary path or the host vehicle drives based on the expected driving path and if it is identified that the host vehicle will collide with the at least one external object.

According to an embodiment, the vehicle control method may further include determining, by the controller, a possibility of a collision between the host vehicle and the at least one external object, using an oriented bounding box (OBB) corresponding to each of the host vehicle and the at least one external object.

According to an embodiment, the vehicle control method may further include adjusting, by the controller, a value of the required steering angle, based on a maximum steering angle for driving control of the host vehicle and an allowable steering angle change amount range, and updating, by the controller, the expected driving path using the adjusted required steering angle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus comprising:

a sensor;

memory storing at least one instruction; and a controller operatively coupled with the sensor and the memory, wherein the at least one instruction is configured to, when executed by the controller, cause the vehicle control apparatus to:

obtain, using the sensor:

environmental information about a surrounding environment of a vehicle that is driving, and driving information of the vehicle, wherein the driving information comprises heading information;

determine a plurality of boundary paths for driving of the vehicle, based on at least one of the environmental information, the driving information, or a maximum drivable curvature of the vehicle;

determine, based on a curvature for the vehicle to drive to a destination, an expected driving path;

determine, based on the expected driving path being located within the plurality of boundary paths, a steering angle for following the expected driving path;

update the expected driving path by updating the heading information, wherein the updated heading information is determined to be inversely proportional to at least one of a distance from a center of gravity of the vehicle to front wheels of the vehicle or a distance from the center of gravity of the vehicle to rear wheels of the vehicle; and control, based on the updated expected driving path, the vehicle.

2. The vehicle control apparatus of claim 1, wherein the at least one instruction is configured to, when executed by the controller, cause the vehicle control apparatus to determine the expected driving path by:

determining the expected driving path further based on at least one of a driving distance in which the vehicle moves from a specified point of a lane, a lateral offset from a center line of the lane to the center of gravity of the vehicle, a yaw rate of the vehicle, a driving speed of the vehicle, or acceleration of the vehicle, wherein the yaw rate is identified with respect to a direction of the center line.

3. The vehicle control apparatus of claim 1, wherein the at least one instruction is configured to, when executed by the controller, cause the vehicle control apparatus to determine the expected driving path by:

determining the expected driving path further based on at least one of:

at least one of a real-time lateral offset of the vehicle, a real-time heading of the vehicle, or a real-time curvature of a lane with respect to a specified point of the lane to the center of gravity of the vehicle, or an expected lateral offset of the vehicle, an expected heading of the vehicle, or an expected curvature of the lane with respect to the specified point to the center of gravity, wherein the expected lateral offset, the expected heading, and the expected curvature are determined with respect to a target point.

4. The vehicle control apparatus of claim 1, wherein the at least one instruction is configured to, when executed by the controller, cause the vehicle control apparatus to update the expected driving path by:

updating the heading information, based on at least one of the determined steering angle, a slip angle at which the vehicle rotates with respect to a driving direction of the vehicle or a driving speed of the vehicle.

5. The vehicle control apparatus of claim 1, wherein the driving information comprises curvature information, and wherein the at least one instruction is configured to, when executed by the controller, cause the vehicle control apparatus to update the expected driving path by:

updating the curvature information, based on at least one of the determined steering angle, a slip angle at which the vehicle rotates with respect to a driving direction of the vehicle, the distance from the center of gravity of the vehicle to the front wheels of the vehicle, the distance from the center of gravity of the vehicle to the rear wheels of the vehicle, or a driving speed of the vehicle; and updating, based on the updated curvature information, the expected driving path.

6. The vehicle control apparatus of claim 5, wherein the at least one instruction is configured to, when executed by the controller, cause the vehicle control apparatus to update the curvature information by:

determining the updated curvature information to be inversely proportional to the distance from the center of gravity of the vehicle to the rear wheels of the vehicle.

7. The vehicle control apparatus of claim 1, wherein the at least one instruction is configured to, when executed by the controller, cause the vehicle control apparatus to determine the expected driving path by:

identifying, based on the environmental information, at least one external object within a threshold distance from the vehicle;

determining the plurality of boundary paths, further based on a probability of a collision with the at least one external object; and determining one of the plurality of boundary paths to be the expected driving path, based on at least one of:

the expected driving path being located outside the plurality of boundary paths, or a determination that the vehicle is on a collision course with the at least one external object.

8. The vehicle control apparatus of claim 7, wherein the at least one instruction is configured to, when executed by the controller, further cause the vehicle control apparatus to:

determine, based on oriented bounding boxes (OBBs) corresponding to the vehicle and the at least one external object, the probability of the collision between the vehicle and the at least one external object.

9. The vehicle control apparatus of claim 1, wherein the at least one instruction is configured to, when executed by the controller, cause the vehicle control apparatus to update the expected driving path by:

adjusting, based on a maximum steering angle of the vehicle and an allowable steering angle change amount range, the determined steering angle; and updating, based on the adjusted steering angle, the expected driving path.

10. A vehicle control method comprising:

obtaining, by a controller and using a sensor:

environmental information about a surrounding environment of a vehicle that is driving, and driving information of the vehicle, wherein the driving information comprises curvature information;

determining, by the controller, a plurality of boundary paths for driving of the vehicle, based on at least one of the environmental information, the driving information, or a maximum drivable curvature of the vehicle;

determining, by the controller and based on a curvature for the vehicle to drive to a destination, an expected driving path;

determining, by the controller and based on the expected driving path being located within the plurality of boundary paths, a steering angle for following the expected driving path;

updating, by the controller, the expected driving path by updating the curvature information, wherein the updated curvature information is determined to be inversely proportional to a distance from a center of gravity of the vehicle to rear wheels of the vehicle; and controlling, by the controller and based on the updated expected driving path, the vehicle.

11. The vehicle control method of claim 10, wherein the determining of the expected driving path comprises:

determining, by the controller, the expected driving path further based on at least one of a driving distance in which the vehicle moves from a specified point of a lane, a lateral offset from a center line of the lane to the center of gravity of the vehicle, a yaw rate of the vehicle, a driving speed of the vehicle, or acceleration of the vehicle, wherein the yaw rate is identified with respect to a direction of the center line.

12. The vehicle control method of claim 10, wherein the determining of the expected driving path comprises:

determining the expected driving path further based on at least one of:

at least one of a real-time lateral offset of the vehicle, a real-time heading of the vehicle, or a real-time curvature of a lane with respect to a specified point of the lane to the center of gravity of the vehicle, or an expected lateral offset of the vehicle, an expected heading of the vehicle, or an expected curvature of the lane with respect to the specified point to the center of gravity, wherein the expected lateral offset, the expected heading, and the expected curvature are determined expected with respect to a target point.

13. The vehicle control method of claim 10, wherein the driving information comprises heading information, and wherein the updating of the expected driving path comprises:

updating, by the controller, the heading information, based on at least one of the determined steering angle, a slip angle at which the vehicle rotates with respect to a driving direction of the vehicle, a distance from the center of gravity of the vehicle to front wheels of the vehicle, the distance from the center of gravity of the vehicle to the rear wheels of the vehicle, or a driving speed of the vehicle; and updating, by the controller and based on the updated heading information, the expected driving path.

14. The vehicle control method of claim 13, wherein the updating of the heading information comprises:

determining, by the controller, the updated heading information to be inversely proportional to at least one of the distance from the center of gravity of the vehicle to the front wheels of the vehicle or the distance from the center of gravity of the vehicle to the rear wheels of the vehicle.

15. The vehicle control method of claim 10, wherein the updating of the expected driving path comprises:

updating, by the controller, the curvature information, based on at least one of the determined steering angle, a slip angle at which the vehicle rotates with respect to a driving direction of the vehicle, a distance from the center of gravity of the vehicle to front wheels of the vehicle, or a driving speed of the vehicle; and updating, by the controller based on the updated curvature information, the expected driving path.

16. The vehicle control method of claim 10, wherein the determining of the expected driving path comprises:

identifying, by the controller and based on the environmental information, at least one external object within a threshold distance from the vehicle;

determining, by the controller, the plurality of boundary paths, further based on a probability of a collision with the at least one external object; and determining one of the plurality of boundary paths to be the expected driving path, based on at least one of:

the expected driving path being located outside the plurality of boundary paths, or a determination that the vehicle is on a collision course with the at least one external object.

17. The vehicle control method of claim 16, further comprising:

determining, by the controller and based on oriented bounding boxes (OBBs) corresponding to the vehicle and the at least one external object, the probability of the collision between the vehicle and the at least one external object.

18. The vehicle control method of claim 10, wherein the updating of the expected driving path comprises:

adjusting, by the controller and based on a maximum steering angle of the vehicle and an allowable steering angle change amount range, the determined steering angle; and updating, by the controller and based on the adjusted steering angle, the expected driving path.

19. A vehicle comprising:

a sensor;

a processor; and memory storing at least one instruction, wherein the at least one instruction is configured to be executed by the processor to cause the vehicle to:

obtain, using the sensor:

environmental information about a surrounding environment of the vehicle that is driving, and driving information of the vehicle, wherein the driving information comprises at least one of heading information or curvature information;

determine a plurality of boundary paths for driving of the vehicle, based on at least one of the environmental information, the driving information, or a maximum drivable curvature of the vehicle;

determine, based on a curvature for the vehicle to drive to a destination, an expected driving path;

determine, based on the expected driving path being located within the plurality of boundary paths, a steering angle for following the expected driving path;

update the expected driving path by updating at least one of the heading information or the curvature information, wherein the updated heading information is negatively correlated with at least one of a distance from a center of gravity of the vehicle to front wheels of the vehicle or a distance from the center of gravity of the vehicle to rear wheels of the vehicle or the updated curvature information is negatively correlated with the distance from the center of gravity of the vehicle to the rear wheels of the vehicle; and control, based on the updated expected driving path, the vehicle.

20. The vehicle of claim 19, wherein the expected driving path is updated using a steering angle determined in a previous cycle to maintain continuity of the expected driving path.

* * * * *